United States Patent [19]

Vogel

[11] Patent Number: 5,402,679
[45] Date of Patent: Apr. 4, 1995

[54] VESSEL FOR DETERMINING THE CALORIC EQUIVALENCE OF A LIQUID BASED ON THE VOLUME AND TYPE OF LIQUID IN THE VESSEL

[76] Inventor: Tony Vogel, P.O. Box 249, Vineburg, Calif. 95487

[21] Appl. No.: 132,710

[22] Filed: Oct. 4, 1993

[51] Int. Cl.⁶ .................................................. G01F 19/00
[52] U.S. Cl. .................................. 73/427; 33/524; D10/46.2; D9/547; 434/127
[58] Field of Search ............................ 73/427, 428, 426; 33/524, 522; D10/46.2, 46.3; D9/547; 434/127

[56] References Cited

U.S. PATENT DOCUMENTS

| D. 200,867 | 4/1965 | Haifley ............................... D7/27 |
| D. 314,722 | 2/1991 | Silver . | |
| 476,136 | 5/1892 | Eustis ................................. 33/522 |
| 645,875 | 3/1900 | Strauss . | |
| 824,532 | 6/1906 | Dunn . | |
| 831,939 | 9/1906 | Deming ............................... 73/427 |
| 923,618 | 6/1909 | Blizard ............................... 73/427 |
| 1,531,767 | 3/1925 | Twombly . | |
| 1,744,328 | 1/1930 | Morley . | |
| 2,010,534 | 8/1935 | Collins ................................ 73/428 |
| 3,437,243 | 4/1969 | Farnsworth . | |
| 3,530,722 | 9/1970 | Miller ................................. 73/427 |
| 3,924,472 | 12/1975 | Harris ............................... D10/46.2 |
| 4,650,218 | 3/1987 | Hawke . | |
| 4,877,119 | 10/1989 | Hosking . | |
| 5,007,743 | 4/1991 | Brennan ............................. 33/524 |

FOREIGN PATENT DOCUMENTS

| 0812331 | 5/1937 | France ............................... 73/427 |
| 0444960 | 2/1949 | Italy ................................... 73/427 |
| 0015059 | 4/1911 | United Kingdom ................ 73/427 |

*Primary Examiner*—Diego F. F. Gutierrez
*Attorney, Agent, or Firm*—Malcolm B. Wittenberg

[57] ABSTRACT

A vessel for monitoring the caloric equivalence of liquids. The vessel's sidewalls are imprinted with rows and columns of indicia relating a volume of liquid held by the vessel to a particular liquid food product and its caloric equivalence value.

5 Claims, 2 Drawing Sheets

VESSEL FOR DETERMINING THE CALORIC EQUIVALENCE OF A LIQUID BASED ON THE VOLUME AND TYPE OF LIQUID IN THE VESSEL

TECHNICAL FIELD OF INVENTION

The present invention deals with a vessel for monitoring the caloric intake of liquids. Through the use of the present invention, one is able to determine precisely the caloric equivalence value for a particular liquid food product merely by observing the liquid meniscus level of the liquid food product to be consumed. No external calculations or reference charts are required.

BACKGROUND OF THE INVENTION

There are many reasons why individuals desire to control the caloric equivalence or limit caloric intake to a predetermined maximum. Certainly, diets engaged in for the purpose of weight loss are motivating factors limiting caloric equivalence. However, physical ailments and disabilities such as diabetes and elevated cholesterol levels are others.

The prior art is replete with various techniques for equating a particular food product with its caloric intake value. However, in each instance, it is required that reference be made to charts, graphs or tables expressing certain caloric equivalence values which then dictate the amount of food product to be consumed by a user. In no instance does the prior art teach a vessel which contemporaneously provides a consumer with the caloric equivalence value of a liquid food product while enabling one to readily compare the caloric intake value of commonly consumed liquid food products, again, without reference being made to any peripheral charts or graphs.

The present invention will be more readily appreciated when considering the following disclosure and appended drawings wherein:

FIG. 1 is a plan side view of a first embodiment of the present invention having tubular sidewalls forming a cylindrical vessel; and FIG. 2 is again a side plan view of a second embodiment of the present invention wherein an appropriately sized vessel is provided with sloping sidewalls forming the frustum of a cone; and FIG. 3 is the depiction of a two dimensional sheet intended to wrap around suitable vessels such as those shown in FIGS. 1 and 2 expressing the typical caloric intake values for commonly consumed liquids for use herein.

SUMMARY OF THE INVENTION

The present invention deals with a vessel for monitoring the caloric equivalence of liquids. Vessels useful in practicing the present invention are provided with an open top for introducing liquids to and removing liquids from said vessel as well as a closed bottom. Sidewalls are provided which are substantially transparent so that the meniscus level of a suitable liquid can be determined by observing the meniscus through the sidewalls. The sidewalls bear rows and columns of indicia relating a volume of liquid held by the vessel to a liquid food product and its caloric equivalence value.

DETAILED DESCRIPTION OF THE INVENTION

Figure 1:
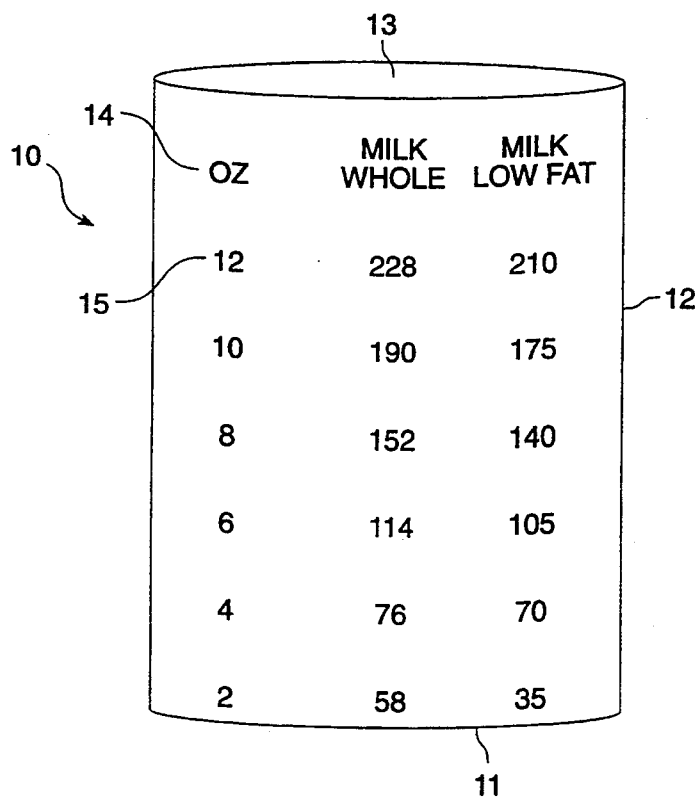
Figure 2:
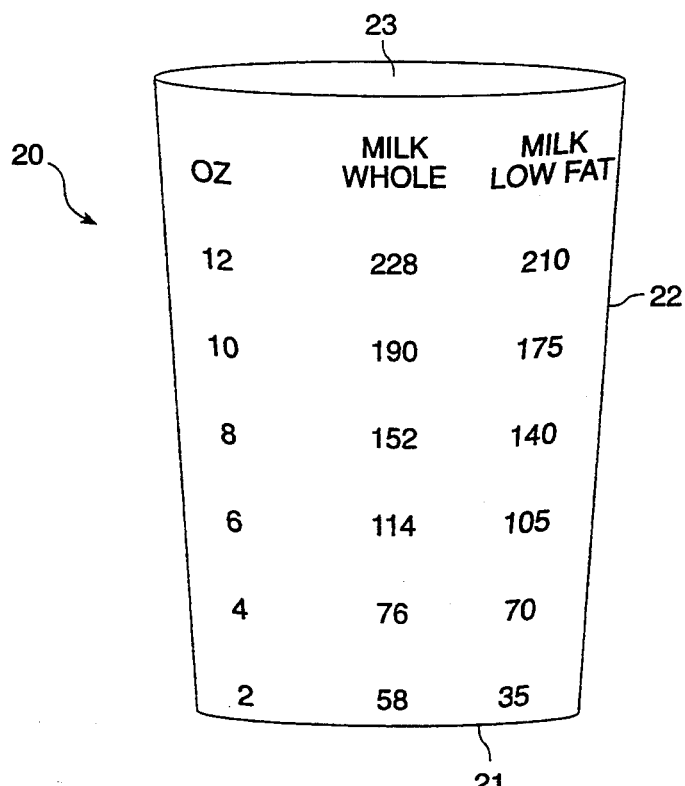

Turning to FIG. 1, vessel 10 is shown with open top 13 and closed bottom 11. As such, vessel 10 is capable of accepting and retaining a suitable liquid and in dispensing the liquid as a simple drinking glass.

Vessel 10 of FIG. 1 is shown with tubular sidewalls 12 forming a uniform cross-section creating a cylinder wherein, as noted above, sidewalls 12 are substantially transparent. Due to the transparency of sidewalls 12, liquid placed within vessel 10 forming a meniscus level therein can be viewed from sidewalls 12 so that the quantity of the liquid can be readily determined. Similarly, a suitable vessel 20 can be provided having closed bottom 21, open top 23 and sloping transparent sidewalls 22 forming a vessel in the shape of a frustum of a core.

Regardless of the shape of the vessel, the sidewalls are imprinted with columns 14 and rows 15 of indicia. In this regard, reference is made to FIG. 3 which depicts a decal or similar arrangement intended to wrap around a vessel in creating the present invention.

Figure 3:
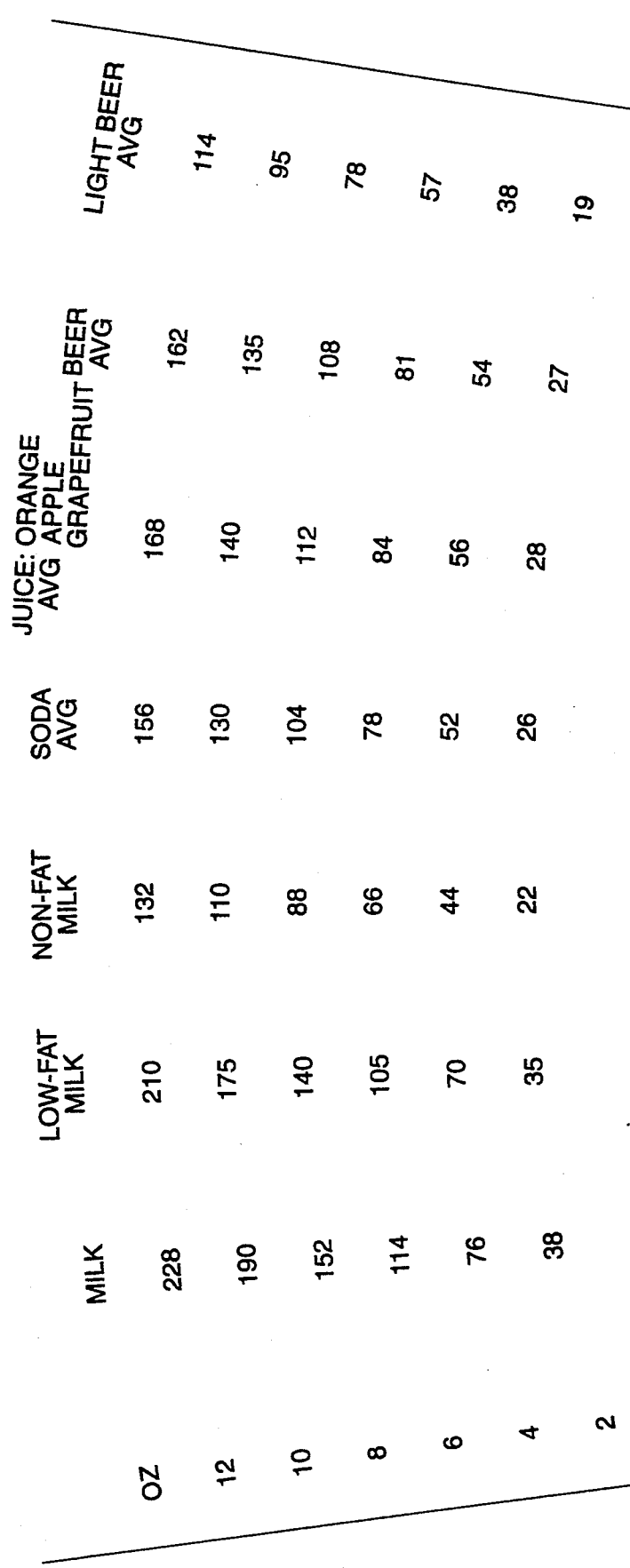

In reference to FIG. 3, it is noted that typical quantities of liquids for consumption at one sitting, for example, two to twelve fluid ounces are equated to commonly consumed liquid food products such as milk, low-fat milk, nonfat milk, soda, fruit juice and beer. Although this list is comprehensive, it is not exhaustive and the present invention can be adapted to recite a myriad of other liquid food products as the present invention is modified to target specific consumer groups.

The present invention can be used in a number of different ways by a typical consumer. For example, the vessel of the present invention can be used as a typical chart helping the consumer to make an enlightened decision as to which liquid food product is to be consumed on a calorie intake basis. Specifically, the consumer might be surprised as to the difference in caloric value between whole milk and nonfat milk. Similarly, one might realize by viewing the present invention that ten ounces of nonfat milk provides the consumer with fewer calories than six ounces of whole milk. As noted, the consumer could then decide based solely upon the respective caloric intake values as to which of these products and which quantities are to be consumed.

In addition, a consumer, knowing that for health or dietary reasons caloric intake must be kept to a specific maximum and desiring to consume a common liquid food product such as fruit juice, could then pour a suitable quantity of the juice into the vessel until the caloric equivalence figure is shown directly on the vessel by the meniscus of the liquid. As noted, in employing the present invention for this purpose, no reference need be made to any external charts or graphs to help the consumer make an enlightened decision as to the quantity of liquid food product to be consumed.

We claim:

1. A vessel for monitoring the caloric equivalence of fluids, said vessel having an open top for introducing the fluids to and removing the fluids from said vessel, a closed bottom and sidewalls, said sidewalls being substantially transparent so that a meniscus level of said fluids can be determined by observing the meniscus through the sidewalls, said sidewalls bearing rows and columns of indicia relating a fluid food product corresponding to the fluid being held by said vessel to its volume and caloric equivalence.

2. The vessel of claim 1 wherein said sidewalls are in the form of a cylinder having substantially uniform cross-section throughout.

3. The vessel of claim 1 wherein said sidewalls are in the form of a frustum of a cone of expanding diameter in moving from said closed bottom to said open top.

4. The vessel of claim 1 wherein said liquids are comprised of at least one member selected from the group consisting of milk, soda, fruit juices and beer.

5. The vessel of claim 1 wherein said indicia relating a volume is calibrated in fluid ounces.

* * * * *